United States Patent [19]

Getz

[11] Patent Number: 4,950,969
[45] Date of Patent: Aug. 21, 1990

[54] VARIABLE MOTOR SPEED CONTROL FOR AUTOMATIC WASHER

[75] Inventor: Edward H. Getz, Pipestone Township, Berrien County, Mich.

[73] Assignee: Whirlpool Corporation, Benton Harbor, Mich.

[21] Appl. No.: 368,146

[22] Filed: Jun. 12, 1989

Related U.S. Application Data

[63] Continuation of Ser. No. 187,338, Apr. 28, 1988, abandoned.

[51] Int. Cl.[5] .............................................. H02P 3/20
[52] U.S. Cl. .................................... 318/740; 318/257; 68/12 R
[58] Field of Search ............... 318/363, 257, 741, 754, 318/740, 297; 68/12 R, 133, 134

[56] References Cited

U.S. PATENT DOCUMENTS

| | | |
|---|---|---|
| 2,195,287 | 3/1940 | Schaefer . |
| 2,242,343 | 5/1941 | Buchanan . |
| 2,279,210 | 4/1942 | Spear . |
| 3,216,226 | 11/1965 | Alger et al. . |
| 3,315,500 | 4/1967 | Brundage et al. . |
| 3,369,381 | 2/1968 | Crane et al. . |
| 3,387,205 | 6/1968 | Tesdall . |
| 3,549,969 | 12/1970 | Yoshimura . |
| 3,622,852 | 11/1971 | Myers . |
| 3,688,170 | 8/1972 | Karklys et al. . |
| 3,891,909 | 6/1975 | Newson . |
| 4,070,605 | 1/1978 | Hoeppner .................. 318/741 |
| 4,215,303 | 7/1980 | Brimer . |
| 4,232,536 | 11/1980 | Koseki et al. . |
| 4,235,085 | 11/1980 | Torita . |
| 4,288,828 | 9/1981 | Kuntner et al. . |
| 4,289,995 | 9/1981 | Sorber et al. . |
| 4,313,075 | 1/1982 | Stewart et al. .................. 318/723 |
| 4,317,343 | 3/1982 | Gerry . |
| 4,372,134 | 2/1983 | Matsuo . |
| 4,411,664 | 10/1983 | Rickard et al. .................. 68/12 R |
| 4,461,985 | 7/1984 | Stitt .................. 318/727 |
| 4,471,274 | 9/1984 | Ross et al. . |
| 4,473,001 | 9/1984 | Rieger . |
| 4,542,633 | 9/1985 | Hirooka et al. .................. 318/282 |

FOREIGN PATENT DOCUMENTS

JP-249695 7/1985 Japan .
JP-005161 7/1986 Japan .

Primary Examiner—David Smith
Attorney, Agent, or Firm—Hill, Van Santen, Steadman & Simpson

[57] ABSTRACT

A variable speed control is provided for controlling a reversing permanent split capacitor motor in an automatic washer. The operation of the motor is controlled such that the motor will accelerate for a first predetermined time period and then coast with no power applied for a second predetermined time period. This generalized operation of the motor occurs in the spin cycle. In the agitate cycle, a logic decoding circuit uses a tach pulse signal indicative of the speed of the motor to provide a time for the motor to be on, and utilizes an AC line current zero crossing signal from a zero crossing detector to establish a time during which the motor is off, the motor on plus off time establishing a stroke rate for the agitate cycle.

14 Claims, 5 Drawing Sheets

VARIABLE MOTOR SPEED CONTROL FOR AUTOMATIC WASHER

This is a continuation of application Ser. No. 187,338, filed Apr. 28, 1988, now abandoned.

The present application relates to the following copending application, assigned to the same assignee as the present application and which is hereby incorporated by reference: Ser. No. 002,674, filed Jan. 12, 1987.

BACKGROUND OF THE INVENTION

The present invention relates to an agitator drive system for use in an automatic washer including an alternately reversing drive motor.

In U.S. Pat. No. 4,542,633 an agitating type washing machine is disclosed as having an agitating wheel connected by a pulley arrangement to a reversible drive motor. The agitating wheel is shown as having short, thick blades. A rotational angle detector is connected to a control that causes the motor, which is described as having high rigidity, to rotate the agitating wheel about a predetermined angle. Upon reaching the predetermined angle, the motor is deenergized until the agitator wheel has stopped, at which time the motor is operated in a reverse direction to again rotate the agitator wheel about the predetermined angle.

An automatic washer manufactured by an assignee of U.S. Pat. No. 4,542,633, and appearing to incorporate the teachings of that patent, has been observed to have an agitator stroke angle of approximately 360° for each stroke at a rate of 70 strokes per minute. The high rigidity motor causes a nearly constant agitator speed in each rotational direction following a brief, rapid acceleration, and followed by the coasting to stop action.

Thus, automatic washer drive systems having reversing motors for producing a generally square wave agitation curve are known. An agitation curve is defined herein as the rotational speed of the agitator over time. A square wave agitation curve is, thus, a constant speed in one direction followed by a constant speed in the opposite rotational direction. Correspondingly, a sinusoidal agitation curve would result from a gradual acceleration followed immediately by a gradual deceleration of the agitator in each rotational direction.

In U.S. Pat. No. 3,315,500 issued to Brundage et al., a mechanism is provided as a drive system for an agitator using a motor operating at a constant speed in one direction to drive a hydraulic transmission which provides very rapid reversal of the agitator through a reversing valve and, thus, is a square wave type agitation motor. An elastic coupling is used between the agitator and the agitator drive shaft to reduce the shock which would otherwise be delivered to the agitator at each reversal. The patent teaches that square wave type agitation motion is preferred because more energy is imparted to the wash load.

An automatic washer having an axial air gap induction motor is disclosed in U.S. Pat. No. 4,232,536. The motor is repeatedly reversed to oscillate a vertical axis agitator through a planetary drive coupled therebetween, the motor being operated at high speeds. The desirability of providing a soft starting action of the agitator each time it reverses is recognized, the soft starting action being provided by the backlash associated with the planetary drive mechanism. No mention is made of the resultant agitator action.

U.S. Pat. No. 4,555,919 discloses a flexible vane agitator for use in a high stroke rate washer. The agitator exhibits a high degree of coupling to a wash load.

The above-cited prior art provides for spin cycles in automatic washers only one constant speed. However, it has been found that more control is achieved if the motor in the automatic washer is periodically energized and deenergized during the spin cycle.

SUMMARY OF THE INVENTION

The present invention is a control circuit for operating a permanent split capacitor motor from an AC source. A driver circuit connects the motor to the AC source.

The PSC motor is connected to the AC source and its windings are energized by a driver circuit. A tachometer is connected to the motor and provides a square wave pulse signal to a pulse generator. The pulse generator provides a series of pulses to a "pulse to DC conversion" circuit. The pulse to DC conversion circuit provides a DC voltage representative of the speed of the motor, the DC voltage being switched to produce a first square wave.

The AC line voltage from the source is connected to an AC line voltage zero crossing detector circuit. The detector circuit outputs a signal indicative of the AC line voltage zero crossing points. A decoding circuit receives the signals from the pulse generator and the zero crossing detector and utilizing these signals interfaces with a counter. The decoding circuit outputs a driver output signal to an agitate/spin logic selection circuit. The logic selection circuit also receives the first square wave and then supplies the proper drive signals to the driver circuit. In the agitate cycle, the output drive signals from the logic selection circuit causes the driver circuit to periodically reverse the motor. In the spin cycle, the logic selection circuit causes the driver to operate the motor in only one direction, periodically energizing and deenergizing the motor, thereby causing the motor to alternately accelerate and coast.

In general, the operation of the motor is controlled such that the motor will accelerate for a first predetermined time period and then coast with no power applied for a second predetermined time period. This generalized operation of the motor occurs in the spin cycle. The decoding circuit uses the tach pulse signal to provide a time for the motor to be on, and utilizes the zero crossing signal from the zero crossing detector to establish a time during which the motor is off, the motor on plus off time establishing a stroke rate for the agitate cycle.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
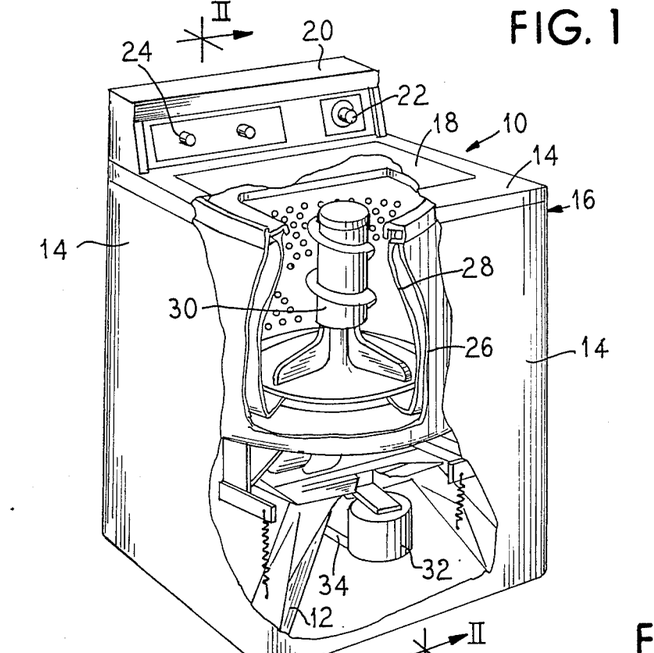
FIG. 1 is a perspective view partially cut away depicting a washing machine utilizing the present invention.

In FIG. 1, reference numeral 10 indicates generally a vertical axis agitator type washing machine having presettable controls for automatically operating the machine through a programmed series of washing, rinsing, and spinning steps. The machine includes a frame 12, carrying panels 14 forming the sides, top, front, and back of a cabinet 16. A hinged lid 18 is provided in the usual manner for access to the interior of the washing machine 10. The washing machine 10 has a rear console 20 in which is disposed manually settable control means, including a timer dial 22 and a temperature selector 24.

Internally of the washing machine 10 there is disposed an imperforate fluid containing tub 26 within which is rotatably mounted a perforate basket 28 for rotation about a vertical axis. A vertically disposed agitator 30 is connected for operation to a motor 32 through a drive mechanism 34.

Figure 2:
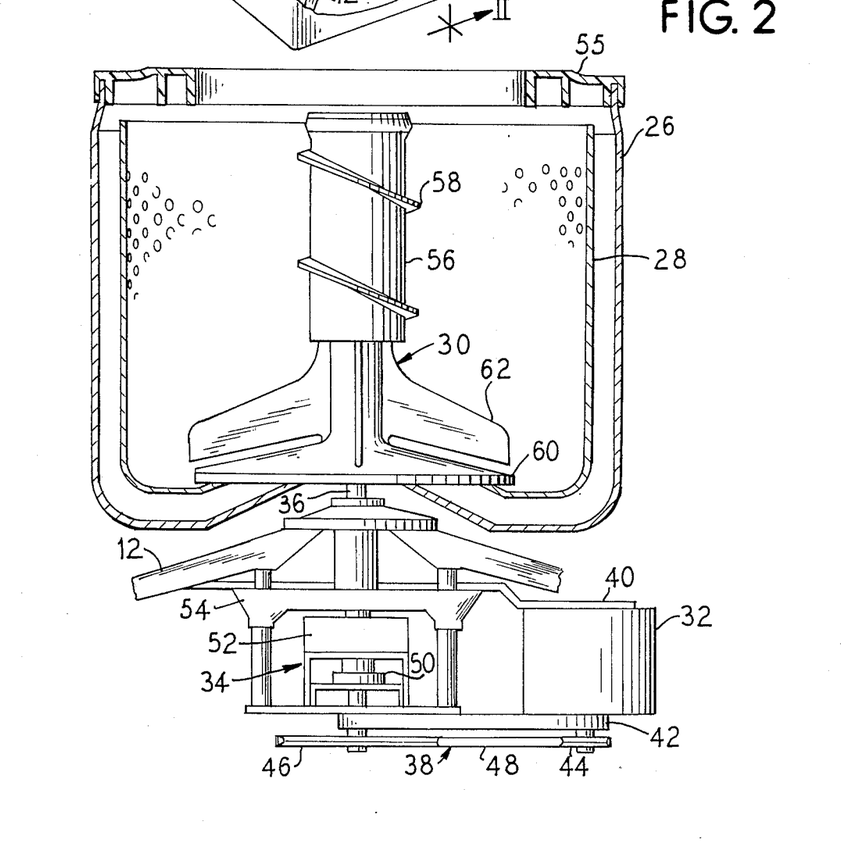
FIG. 2 is a cross-sectional view of a portion of the FIG. 1 washing machine.

Referring to FIG. 2, the agitator 30 is linked by a shaft 36 to the reduction drive 34, which in turn is driven through a pulley arrangement 38 by the motor 32. The motor 32 is a high slippage motor and preferably a permanent split-capacitance (PSC) motor which has a low start torque relative to its breakdown torque to provide a soft start of the agitator. The PSC motor 32 also has a relatively flat load curve above the breakdown point so that steady state speed will not vary greatly with load. The motor 32 is mounted in a bracket arrangement 40 and 42 which connects to the frame 12 of the washer 10.

The motor 32 is linked by the pulley arrangement 38, including a drive pulley 44 and a driven pulley 46 connected by a belt 48, to the reduction drive 34. The reduction drive 34, in one embodiment, is a planetary gear drive which includes a spring clutch 50 and a planetary housing 52 mounted in a reduction drive frame 54 that connects to the frame 12. Although a planetary reduction drive is disclosed herein for use with the present invention, it is also contemplated that a variety of other reduction drive arrangements could be utilized as is known to those skilled in the art. It is also contemplated to eliminate the reduction drive and link the agitator directly to an appropriately selected motor.

The shaft 36 extends upwardly from the reduction drive 34 through the tub 26 and the perforate basket 28 and connects to the agitator 30. A tub ring 55 extends around the top of tub 26. The agitator 30 is a dual action agitator having an upper barrel 56 with helical vanes 58, as well as a lower agitator portion 60 from which extends a plurality of flexible vanes 62. The flexible vanes 62 enable the agitator 30 to absorb energy as the direction of rotation is reversed, while still coupling the agitator 30 to the load provided by water within the tub 26, as well as any articles of clothing therein. This coupling between the agitator and the clothes and water loads the motor to cause the speed to increase slowly. The flexible vanes provide a more uniform load coupling and torque over the angular range of the stroke over a range of clothes load sizes. The flexibility of the vanes 62 also prevents the impact loading at the beginning of the stroke from exceeding the locked rotor torque of the motor 32.

Figure 3:
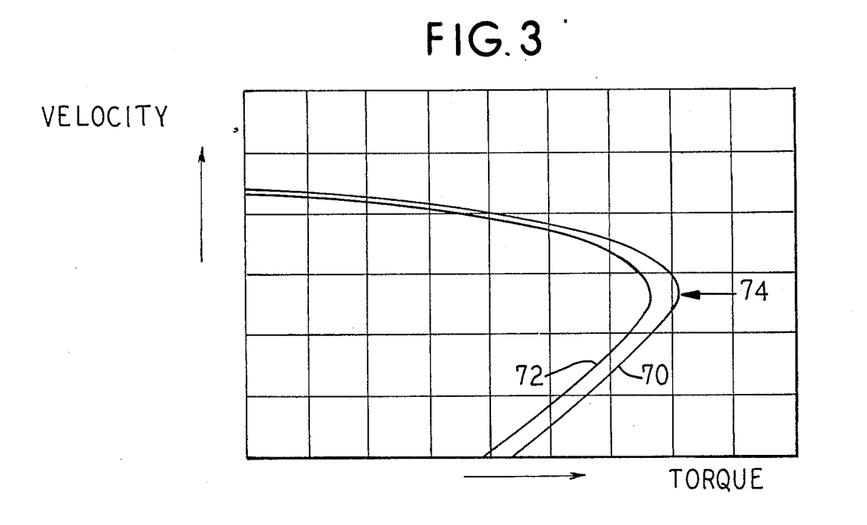
FIG. 3 is a graph of the torque vs. speed diagram for a permanent split capacitor motor used in the FIG. 1 washing machine.

The torque/speed characteristics of the PSC motor 32 are shown in FIG. 3. The torque/speed curve is plotted at 70 for a first direction of operation and the curve 72 shows the torque/speed characteristic in an opposite direction. As discussed above, the motor 32 has a low torque at slow speeds, and a relatively flat curve above a breakover or breakdown point 74 is indicated by the rightmost portion of the curve having the highest torque value. It can be seen that the PSC motor 32 is operating primarily on the start-up portion of the torque/speed curve.

Figure 4:
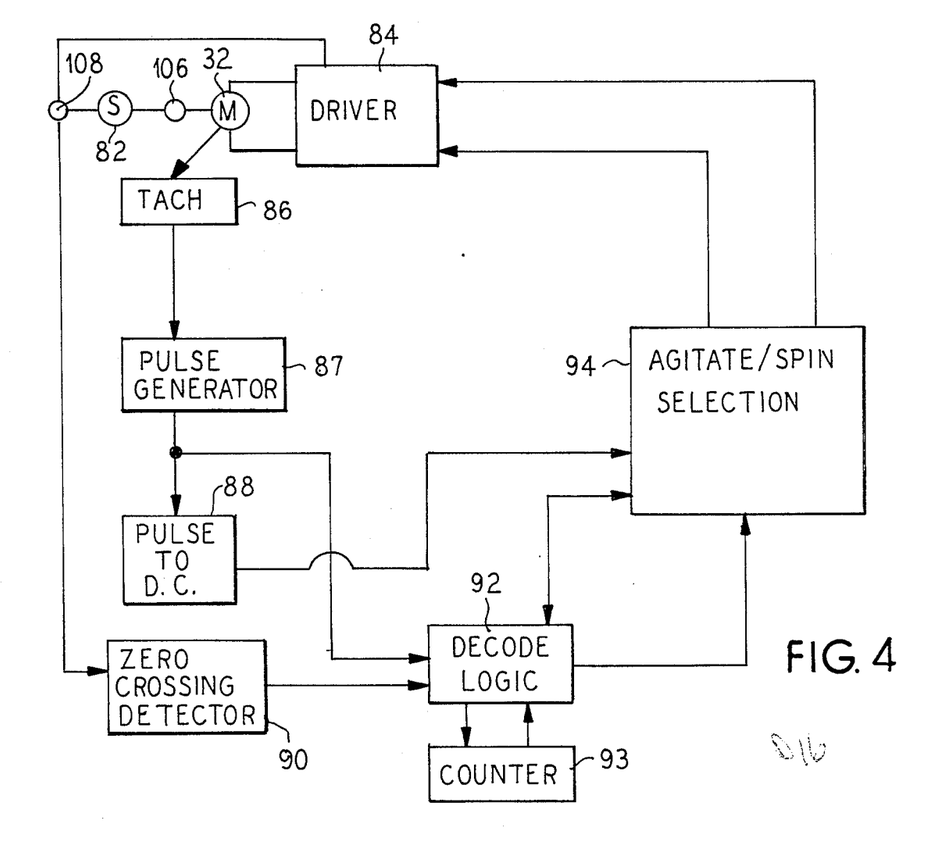
FIG. 4 is a general block diagram of a control circuit for use with the permanent split capacitor motor.

FIG. 4 is a general block diagram of the present invention. The permanent split capacitor (PSC) motor 32 is connected to an AC source 82 and its above described windings are energized by a driver circuit 84. Tachometer 86 is connected to the motor 32 and provides a square wave pulse signal to the pulse generator 87. The pulse generator 87 provides a series of pulses to pulse to DC conversion circuit 88. The pulse to DC conversion circuit 88 provides a DC voltage representative of the speed of the motor 32 in the form of a first square wave to an agitate/spin selection circuit 94.

The AC line voltage from the source 82 is connected to an AC line voltage zero crossing detector circuit 90. The detector circuit 90 outputs a signal indicative of the AC line voltage zero crossing points. A logic decoding circuit 92 receives the signals from the pulse generator 87 and the zero crossing detector 90 and utilizing these signals interfaces with a counter 93. The logic decoding circuit 92 outputs a driver output signal to the agitate/spin selection circuit 94. The logic selection circuit 94 then supplies the proper drive signals to the driver circuit 84 In the agitate selection the output drive signals from the logic selection circuit 94 will cause the driver circuit 84 to periodically reverse the motor 32. In the spin selection the logic selection circuit 94 causes the driver 4 to operate the motor 32 in only one direction.

In general, the operation of the motor is controlled such that the motor will accelerate for a first predetermined time period and then coast with no power applied for a second predetermined time period. This generalized operation of the motor occurs in the spin cycle. In the agitate cycle the logic decoding circuit 92 uses the tach pulse signal to provide a time for the motor to be on, and utilizes the zero crossing signal from the zero crossing detector 90 to establish a time during which the motor is off, the motor on plus off time establishing a stroke rate for the washing cycle.

Figure 5A:
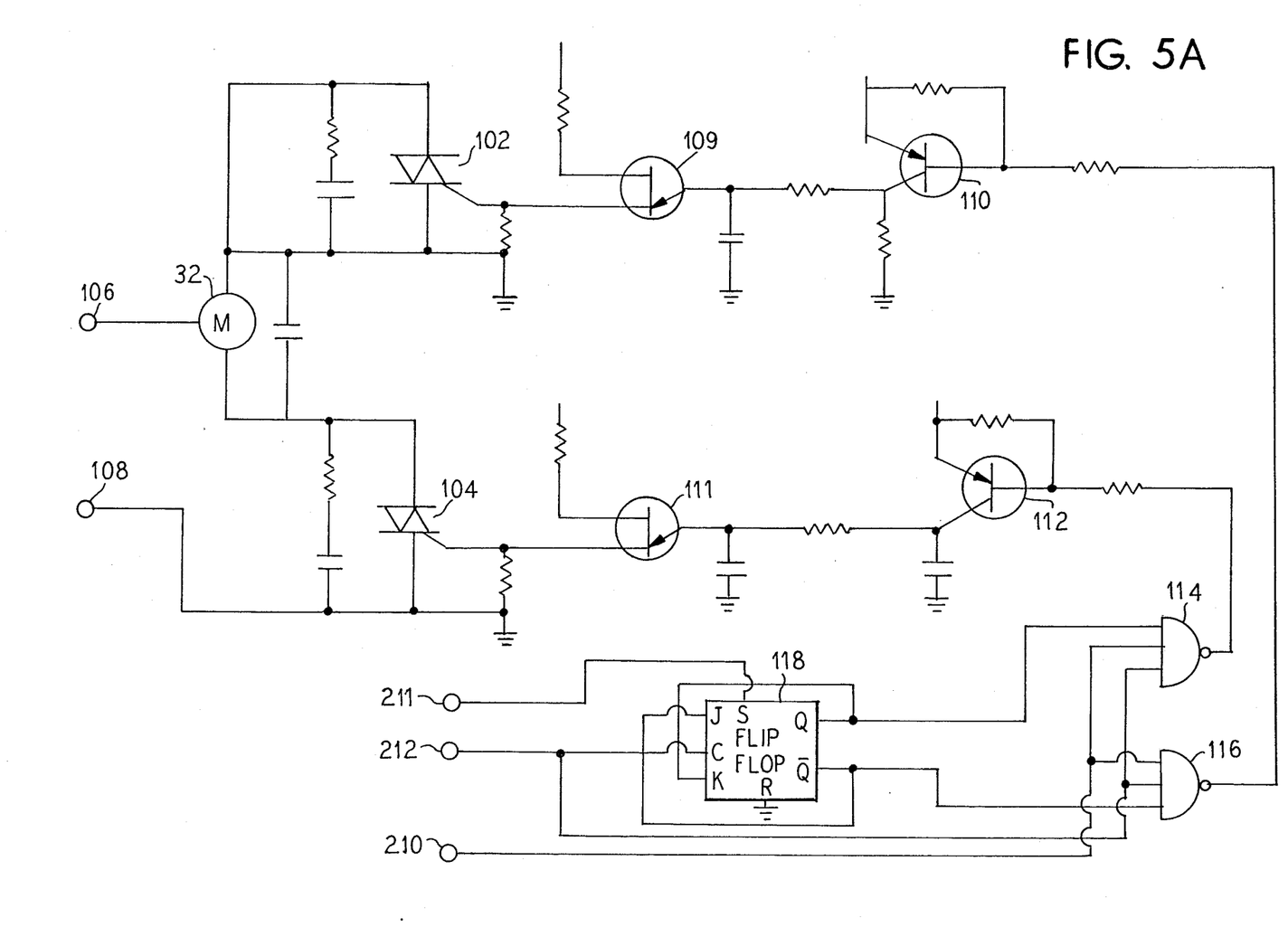
FIGS. 5a through 5e are circuit diagrams of different portions of the FIG. 4 block diagram.

As shown in FIG. 5a first and second triacs 102 and 104 alternately power a reversible PSC motor 32 which is connected to AC line voltage terminals 106 and 108. The gates of the triacs 102 and 104 are connected via unijunction transistors 109 and 111 to transistor amplifiers 110 and 112, respectively. The inputs to the transistor amplifiers 110 and 112 are connected to the outputs of two NAND gates 114 and 116. One of the inputs of the NAND gates 114 and 116 are connected to the outputs, Q and $\overline{Q}$, of flip-flop 118. Operation of the flip-flop 118 thereby selects one of the NAND gates 114 and 116, thereby ultimately selecting one of the triacs 102 and 104. In an agitate cycle of the washer, the flip-flop 118 is operated to alternate the direction of rotation of the motor 32. In a spin cycle of the washing machine the flip-flop 118 is inoperable and one of the NAND gates 114 or 116 is selected for a motor rotational direction in a single direction. FIG. 5a thereby depicts a circuit which is referred to as driver circuit 84 in FIG. 4.

Figures 5B, 5C:
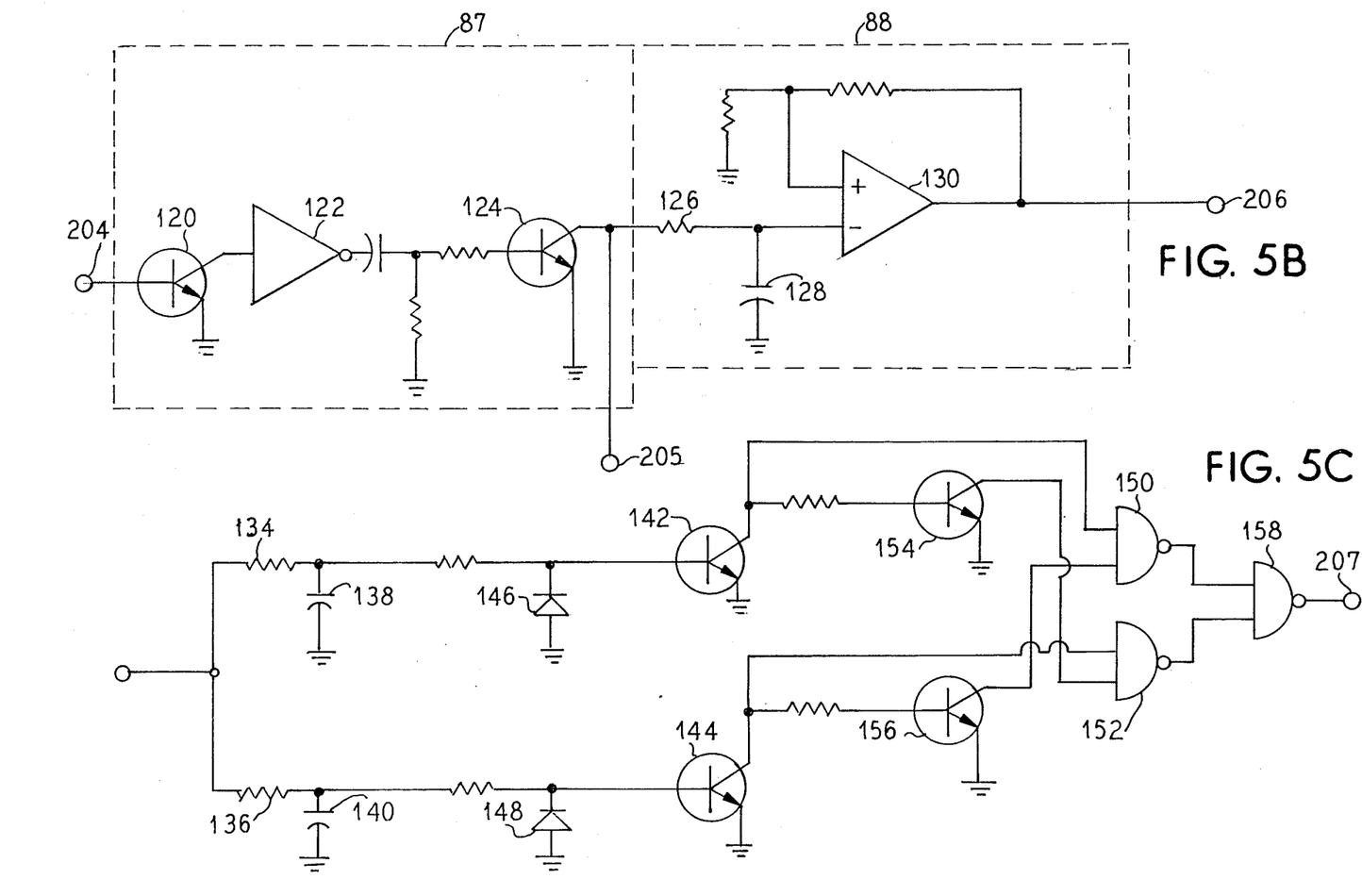

FIG. 5b is a circuit diagram of the pulse generator 87 and the pulse to DC conversion circuit 88 shown in FIG. 4. The output of the tachometer 82 is received by the pulse generator 87 on terminal 204 and appears on the base of transistor 120. The output of transistor 120 is connected to the input of operational amplifier 122 which in turn has its output connected to the base of transistor 124. The output of 124 provides the tach pulse signal on terminal 205 and is also connected through series resistor 126 and the parallel capacitor 128 which forms an integrating circuit. Thus, the junction of the resistor 126 and capacitor 128 of the pulse to DC conversion circuit 88 provides a DC voltage proportional to the speed of the motor 32. The DC voltage is inputted to a Schmidt trigger 130. The output on terminal 206 of the Schmidt trigger 130, is the first square wave and is utilized in the spin cycle through the agitate/spin logic selection circuit 94 to cause one of the triacs 102 or 104 to turn off for a period of time after which, as the motor starts coasting down, the DC voltage level at the input of the Schmidt trigger 130 decreases until the output of the Schmidt trigger again changes state. At this time the same triac is turned back on and the motor speed increases until the DC voltage reaches a high level at which time again the Schmidt trigger 130 changes state and the process is repeated. Thus, during the spin cycle, a series of times during which the motor is powered is followed by the motor being allowed to coast. This procedure provides a reduction in the RFI generated by the circuit. Furthermore, the switch 132 in the selection logic 94 is selected for the spin position in order to ultimately connect the output of the Schmidt trigger 130 to one of the NAND gates 114 or 116 in the driver 84.

FIG. 5c is a circuit diagram of the AC line voltage zero crossing detector 90 depicted in FIG. 4. Terminal 106 of the AC line voltage is connected to resistors 134 and 136 which in turn are connected to capacitors 138 and 140, respectively. In the preferred embodiment the resistors 134 and 136 have a value of 100 kilohms and capacitor 138 has a value of 0.0015 microfarads whereas the capacitor 140 has a value of 0.22 microfarads. Thus it can be seen that the circuits cause a phase difference. The signals appear on the base of transistors 142 and 144 across which are connected diodes 146 and 148. The outputs of transistors 142 and 144 are applied to the inputs of NAND gates 150 and 152, respectively as well as to the bases of transistors 154 and 156, respectively. The outputs of transistor 154 and 156 are connected to the inputs of NAND gates 150 and 152. The outputs of the gates 150 and 152 are connected to the inputs of gate 158, the output of which is the signal indicative of the zero crossing of the AC line voltage and appears on terminal 207.

This output signal then is a pulse which begins at a predetermined time delay after the zero crossing of the AC line voltage and has a predetermined width as determined by the phase delay at the input of the AC line voltage zero crossing detector 90. Thus a pulse is generated after every zero crossing of the AC line voltage. This pulse will then be used to ultimately fire the triacs 102 and 104. The pulse width is sufficient to provide for any phase difference between the AC line current flowing through the motor 32 and the AC line voltage appearing on terminals 106 and 108. It is to be understood that the zero crossing signal output from the detector 90 is synchronized to the AC line voltage and is not synchronized to the AC current flowing through the motor 32.

Figures 5D, 5E:
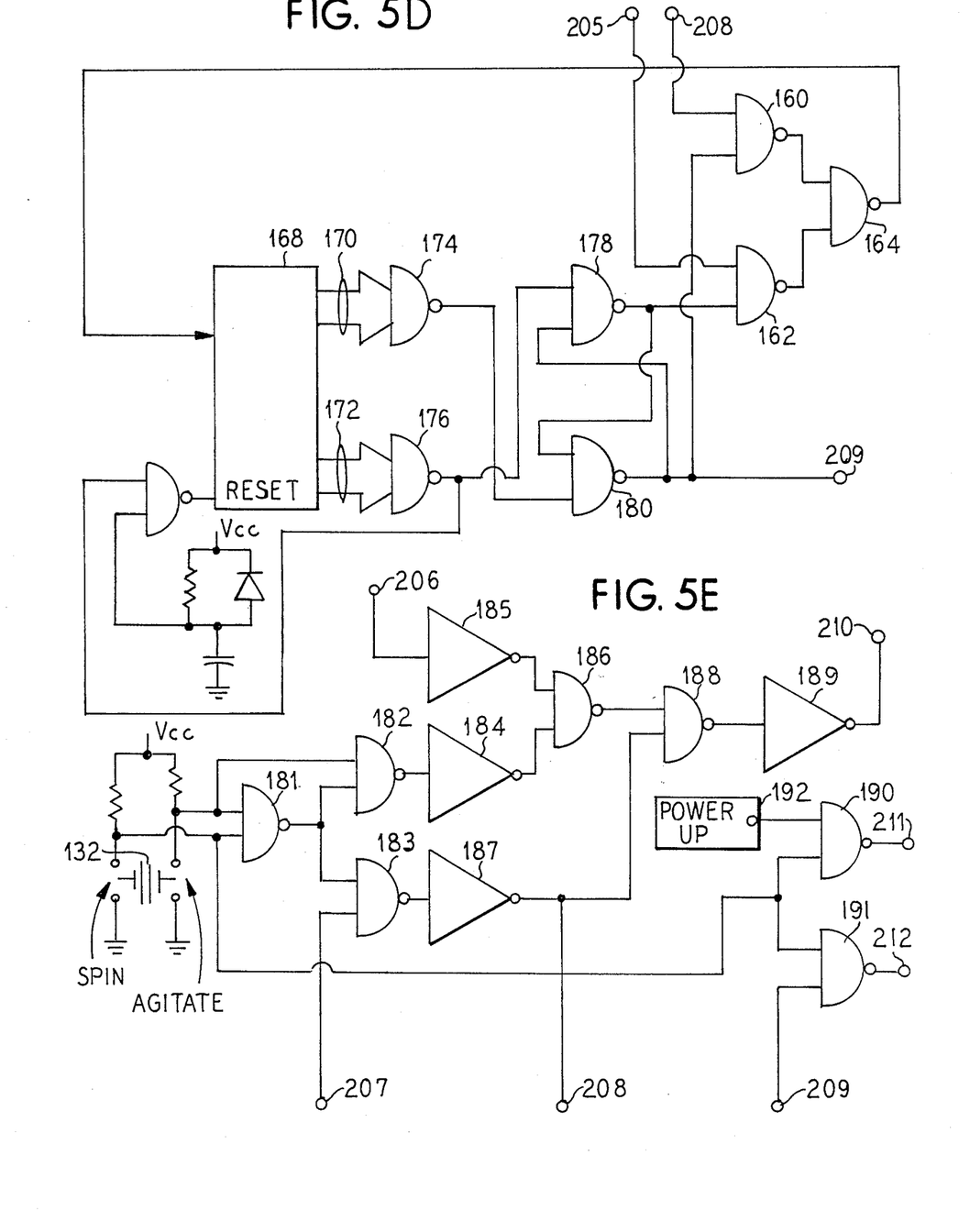

Referring now to FIG. 5d, gate 160 in the logic decode circuitry 92 receives on one of its inputs connected to terminal 208 the zero crossing pulse signal from the zero crossing detector 90. Gate 162 on one of its inputs connected to terminal 205 receives the tach pulse signal from the tach pulse generator 87. The outputs of the gates 160 and 162 are applied to the inputs of gate 164 whose output in turn is connected to an input of a ripple counter 168. The first and second sets of output lines 170 and 172 from the ripple counter 168 are connected to inputs of gates 174 and 176, respectively. Gates 174 and 176 have their outputs connected to the inputs of gates 178 and 180, respectively. The other inputs of gates 178 and 180 are connected to the outputs of gates 176 and 174 as shown. The output of gate 180 is the output signal on terminal 209 from the decode logic circuit 92. The output from gate 176 is used to reset the ripple counter 168. The output from gate 178 is connected to one of the inputs of gates 162 and the output of gate 180 is connected to one of the inputs of gates 160. The gates 178 in combination with gates 160, 162 and 164 determine the off time as a timing function of the ripple counter 168. Gates 176 and 180 determine the on time plus the off time which is used to gate the triacs 102 and 104. Thus the waveform appearing at the output terminal 209 of decode logic circuit 92 is essentially a square wave having a first predetermined amount of off time and an overall period which is equal to the on time plus the off time. Thus depending upon the setting of the flip-flop 118 one of the triacs 102 or 104 is selected and is energized for the on time period of the signal appearing at the output of the logic decode circuit 92 after which the triac is turned off during the off time of that signal. This causes the motor 32 to accelerate during the on time and coast during the off time.

As shown in FIG. 5e the agitate/spin selection logic 94 has a selection switch 132 which in an addition to an off position has a spin setting and an agitate setting. The outputs from the spin and agitating settings are connected to the inputs of gate 181 the output of which is connected to inputs of gates 182 and 183, respectively. The other input of gate 182 is connected to the agitate portion of switch 132 and the other input of gate 183 is connected to terminal 207 which receives the zero crossing pulse detection signal from the zero crossing detector 90. The output of gate 182 is connected to the input of inverter 184 and terminal 206 receiving the DC voltage from the pulse to DC converter 88 is connected to the input of inverter 185. The outputs of inverters 184 and 185 are connected to the inputs of gate 186. The output of gate 183 is connected to inverter 187, the output of which is connected to terminal 208 which supplies the zero crossing pulse signal to the decode logic 92. The output of inverter 187 is also connected to one of the inputs of gate 188, the other input of gate 188 being the output of gate 186. The output of gate 188 is connected through inverter 189 to terminal 210 which is connected to the NAND gates 114 and 116 in the driver circuit 184. The spin switch portion of switch 132 is connected to the inputs of gates 190 and 191. The other input of gate 190 is connected to a power up circuit 192 which disables the driver 84 while the circuitry is being initialized. The output of gate 190 is connected to terminal 211 which in the driver circuit 84 is connected to the set terminal of the flip-flop 118. The other input of gate 191 is connected to terminal 209 which is the output of the decode logic circuit 92. The output of gate 191 is connected to the terminal 212 which is the input of the flip-flop 118 in the driver 84.

It can be appreciated that the control circuit of the present invention can be used for a variety of applications and in various appliances. The above-described embodiment of the control circuit used for controlling a permanent split capacitor motor in an automatic washing machine is just one example.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

The embodiments of the invention in which an exclusive property or privilege is claimed are defined as follows:

1. A variable speed control circuit for operating a permanent split capacitor motor from an AC line voltage, the motor connected by a drive to an agitator mounted within a wash tub of an automatic washer, having a spin cycle and an agitate cycle, comprising:
   means for driving said motor in the spin cycle from the AC line voltage, said means for driving receiving a drive signal;
   means for providing a first signal indicative of the speed of said motor;
   means for providing a DC voltage from said first signal also indicative of the speed of said motor;
   means for switching said DC voltage to produce a first substantially square wave, said first square wave being said drive signal in the spin cycle so as to periodically energize and deenergize said motor, thereby causing said motor to periodically accelerate and coast;
   means for producing a second signal indicative of a zero crossing of the AC line voltage;
   means for providing a timing function receiving said first and second signals and producing a second substantially square wave having an on time determined by said first signal and an off time determined by said second signal, said second square wave being said drive signal in the agitate cycle; and
   a selection logic circuit receiving said first and second square waves and for an agitate cycle providing said second square wave alternately on first and second drive lines to said motor to cause said motor to periodically reverse rotation and for a spin cycle providing said first square wave on only one of said drive lines to said motor to cause said motor to rotate in one direction.

2. The variable speed control circuit as claimed in claim 1, wherein said means for driving has first and second transistor drive circuits connected to gates of first and second triacs, said first and second triacs, respectively, conducting alternately to cause said motor to reverse rotation for the agitate cycle and wherein only one of said transistor drive circuits and its corresponding triac receive said drive signal to cause said motor to be periodically energized in the spin cycle, said first and second triacs connected to first and second windings of said motor to connect said motor to said AC line voltage.

3. The variable speed control circuit as claimed in claim 1, wherein said means for providing a first signal has a tachometer connected to said motor which supplies a tach signal to a pulse generator, said pulse generator producing said first signal having a series of pulses indicative of the speed of said motor.

4. The variable speed control circuit as claimed in claim 1, wherein said means for producing a second signal has first and second time delay circuits receiving said AC line voltage and providing first and second out of phase signals, said first time delay circuit having a time delay different from a time delay of said second time delay circuit; and a circuit for combining said first and second out of phase signals to produce said second signal having a series of pulses with a predetermined pulse width and corresponding to zero crossings of the AC line voltage.

5. The variable speed control circuit as claimed in claim 1, wherein said means for providing a first signal has a tachometer connected to a shaft of said motor and a transistor amplifier circuit receiving an output of said tachometer and providing said first signal having a series of pulses indicative of the speed of said motor.

6. The variable speed control circuit as claimed in claim 5, wherein said means for providing a DC voltage being an integrator circuit.

7. The variable speed control circuit as claimed in claim 6, wherein said means for switching being a Schmidt trigger circuit.

8. A variable speed motor control circuit for operating a permanent split capacitor motor from an AC line voltage, comprising:
   means for driving said motor from the AC line voltage, said means for driving receiving a drive signal;
   means for providing a first signal indicative of the speed of said motor;
   means for providing a DC voltage from said first signal also indicative of the speed of said motor;
   means for switching said DC voltage to produce a first substantially square wave, said first square wave being said drive signal so as to periodically energize and deenergize said motor, thereby causing said motor to be periodically energized triac connecting to the winding of said motor to periodically accelerate and coast;
   means for producing a second signal indicative of a zero crossing of the AC line voltage;
   means for providing a timing function receiving said first and second signals and producing a second substantially square wave having an on time determined by said first signal and an off time determined by said second signal, said second square wave being said drive signal in the agitate cycle; and
   a selection logic circuit receiving said first and second square waves and for an agitate cycle providing said second square wave alternately on first and second drive lines to said motor to cause said motor to periodically reverse rotation and for a spin cycle providing said first square wave on only one of said drive lines to said motor to cause said motor to rotate in one direction.

9. The variable speed control circuit as claimed in claim 8, wherein said means for driving has at least one transistor drive circuit connected to a gate of a triac receives said drive signal to cause said motor to connect said motor to said AC line voltage.

10. The variable speed control circuit as claimed in claim 8, wherein said means for providing a first signal has a tachometer connected to said motor which supplies a tach signal to a pulse generator, said pulse generator producing said first signal having a series of pulses indicative of the speed of said motor.

11. The variable speed control circuit as claimed in claim 8, wherein said means for providing a first signal has a tachometer connected to a shaft of said motor and a transistor amplifier circuit receiving an output of said tachometer and providing said first signal having a series of pulses indicative of the speed of said motor.

12. The variable speed control circuit as claimed in claim 11, wherein said means for providing a DC voltage being an integrator circuit.

13. The variable speed control circuit as claimed in claim 12, wherein said means for switching being a Schmidt trigger circuit.

14. A method for operating a permanent split capacitor motor from an AC line voltage, the motor connected by a drive to an agitator mounted within a wash tub of an automatic washer, having a spin cycle and an agitate cycle, comprising the steps of:

driving said motor in the spin cycle from the AC line voltage with a means for driving receiving a drive signal;

providing a first signal indicative of the speed of said motor;

providing a DC voltage from said first signal also indicative of the speed of said motor;

switching said DC voltage to produce a first substantially square wave, said first square wave being said drive signal in the spin cycle so as to periodically energize and deenergize said motor, thereby causing said motor to periodically accelerate and coast;

producing a second signal indicative of a zero crossing of the AC line voltage;

providing a timing function receiving said first and second signals and producing a second substantially square wave having an on time determined by said first signal and an off time determined by said second signal, said second square wave being said drive signal in the agitate cycle; and for an agitate cycle providing said second square wave alternately on first and second drive lines to said motor to cause said motor to periodically reverse rotation and for a spin cycle providing first square wave on only one of said drive lines to said motor to cause said motor to rotate in one direction.

* * * * *